Hinn

[11] 4,263,622
[45] Apr. 21, 1981

[54] AUTOMATIC KINESCOPE BIASING SYSTEM

[75] Inventor: Werner Hinn, Zollikerberg, Switzerland

[73] Assignee: RCA Corporation, New York, N.Y.

[21] Appl. No.: 110,242

[22] Filed: Jan. 7, 1980

[30] Foreign Application Priority Data

Jan. 30, 1979 [GB] United Kingdom .............. 03212/79

[51] Int. Cl.³ .................... H04N 9/20; H04N 9/535; H04N 5/68
[52] U.S. Cl. ................................. 358/242; 358/65; 358/29
[58] Field of Search ................ 358/10, 29, 64, 65, 358/242, 243, 139, 168, 169

[56] References Cited

U.S. PATENT DOCUMENTS 3,558,817  1/1971  Van den Avoort et al. ........ 358/242
4,012,775  3/1977  Smith ................................ 358/29

OTHER PUBLICATIONS

Jensen, "Permanent Colour Truth", *Elektronic*, Apr. 1975 (Danish).
Lavigne, "Towards True Color Stability in Television", Videocolor S. A., Paris, France, No. 1600, Jun. 1978 pp. 11-20.
Gublass, "Bildrohrenasteuerung mit automatischer Dunkelstrom-Ragelung", *Funkschau*, 1979, Heft 12, pp. 674-678.
Jensen, "Colour receiver design", *Wireless World*, Jul., 1978, pp. 51-54.

*Primary Examiner*—John C. Martin
*Attorney, Agent, or Firm*—Eugene M. Whitacre; William H. Meagher; Ronald H. Kurdyla

[57] ABSTRACT

Apparatus is disclosed in a video signal processing system for automatically controlling the blanking (black) current level of an image reproducing kinescope having cathode and grid intensity control electrodes. During measuring intervals when cathode blanking current is to be monitored, a fixed voltage is applied to the cathode over the entire measuring interval, and a locally generated auxiliary signal is applied to the grid electrode during a portion of the measuring interval. A version of the grid signal appears as a cathode output signal proportional to the level of cathode blanking current conduction. A voltage responsive sensing network coupled to the cathode provides an output difference voltage proportional to the difference in cathode current conducted over the measuring interval. This voltage is utilized to modify the cathode bias in a direction to produce the desired cathode blanking current level at or in the vicinity of kinescope cut-off.

9 Claims, 18 Drawing Figures

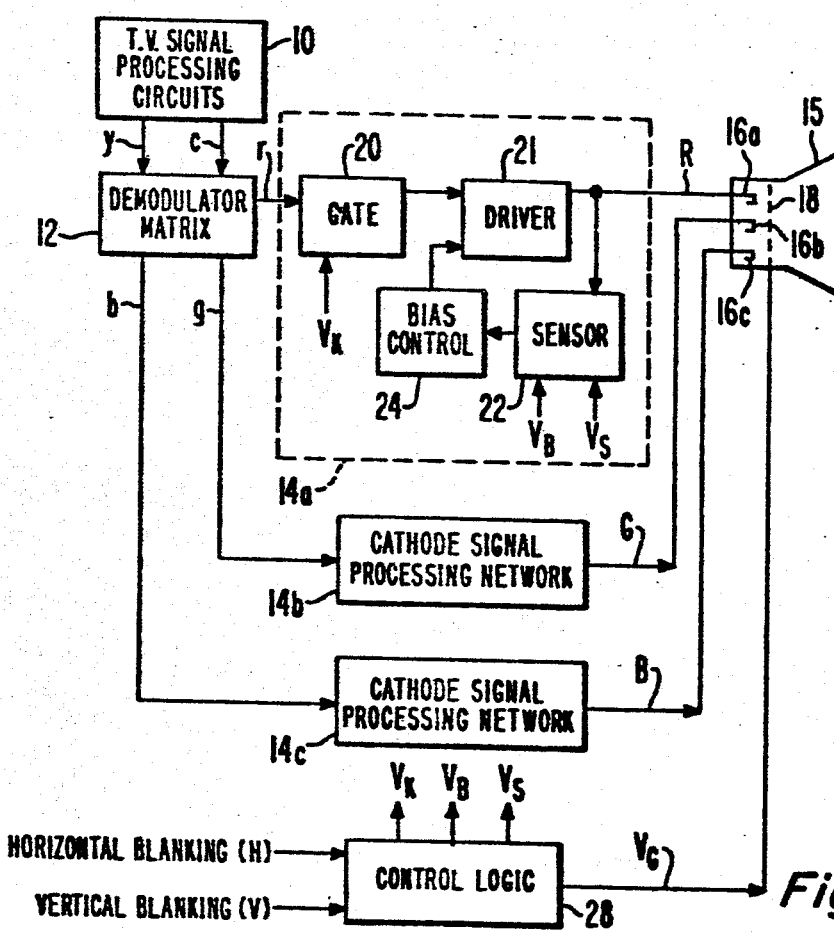
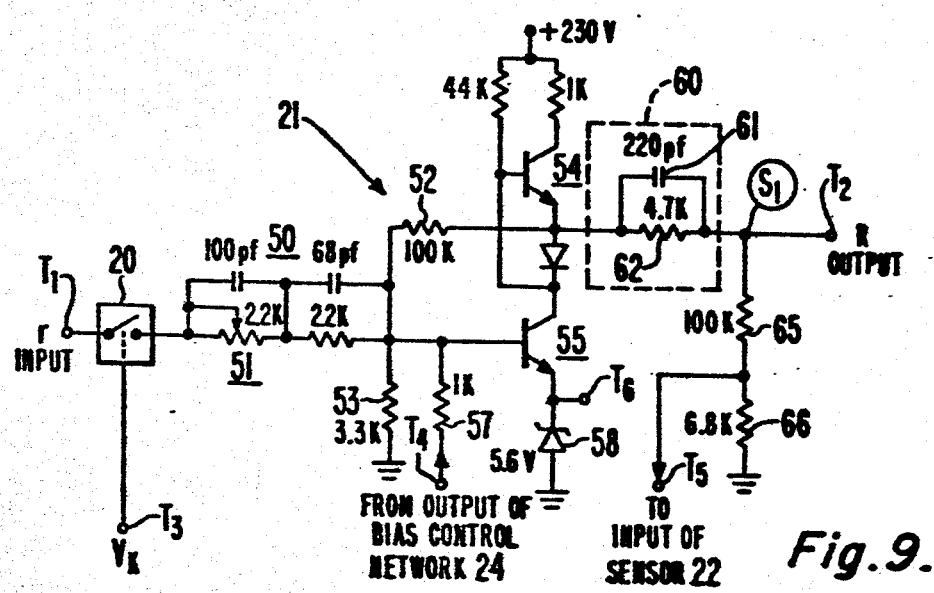
Fig. 1.
Fig. 9.

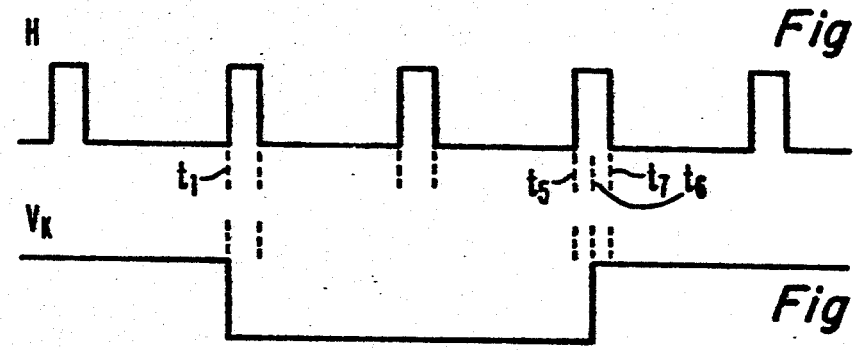
Fig. 11.
Fig. 12.
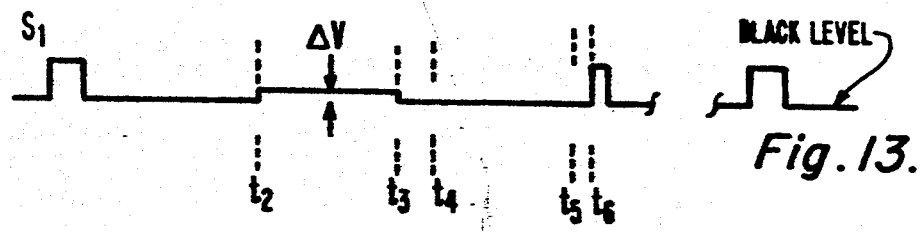
Fig. 13.
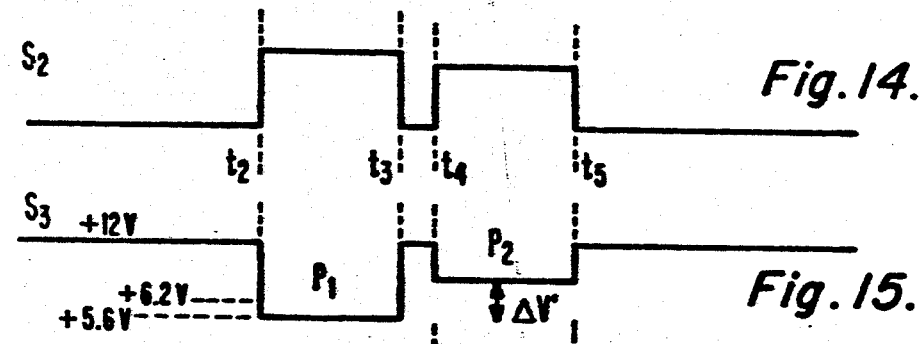
Fig. 14.
Fig. 15.
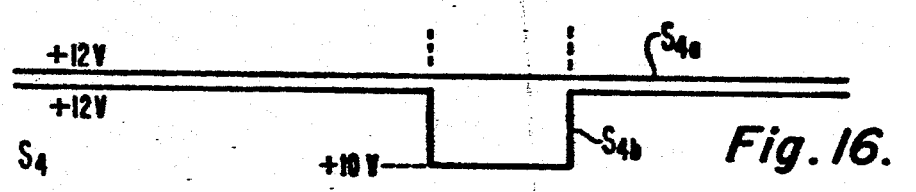
Fig. 16.

AUTOMATIC KINESCOPE BIASING SYSTEM

This invention relates to apparatus for automatically controlling the bias of an image reproducing kinescope in a video signal processing system such as a color television receiver or an equivalent system, in order to establish proper blanking current levels for each of the electron guns of the kinescope.

A color image reproducing kinescope included in a color television receiver comprises a plurality of electron guns each energized by red, green and blue color representative signals derived from a composite color television signal. Since a reproduced color image is defined by individual ones of these signals or a combination thereof, optimum reproduction of a color image requires that the relative proportions of these color signals be correct at all kinescope drive levels from white through gray to black, at which point the three electron guns should exhibit significantly reduced conduction or be cut-off.

The optimum reproduction of a color picture and gray scale tracking of the kinescope can be adversely affected when the bias of the electron guns varies from a predetermined level, causing unwanted kinescope cut-off errors to be produced. These errors are visible as a color tint on a displayed monochrome picture, and also upset the color fidelity of a displayed color image. The cut-off errors can be caused by a variety of factors, including variations in the operating characteristics of the kinescope and associated circuits (e.g., due to aging), temperature effects and momentary kinescope "flashovers".

Since it is desirable to assure that the proportioning of the color signals to the kinescope is correct at all picture brightness levels, color television receivers commonly include provisions for adjusting the kinescope and associated circuits in a set-up or service operating mode of the receiver in accordance with well known procedures. Briefly, a service switch with "normal" and "service" positions is operatively associated with the receiver signal processing circuits and the kinescope. In the "service" position, video signals are decoupled from the kinescope and vertical scan is collapsed. The bias of each electron gun is then adjusted to establish a desired blanking current (e.g., a few microamperes) for each electron gun. This adjustment ensures that the kinescope is properly blanked in the absence of an applied video signal or in response to a black reference level of the video signal, and also ensures a proper proportion of color signals at all brightness levels. The kinescope driver circuits associated with each electron gun are then adjusted for a desired gain (e.g., to compensate for kinescope phosphor inefficiencies) to assure a proper proportion of red, green and blue signal drive when the receiver operates normally.

The kinescope blanking adjustment is time-consuming and inconvenient, and typically should be performed several times during the life of the kinescope. In addition, the kinescope blanking and gain adjustments often interact with each other, thereby requiring that successive adjustments be made. Therefore, it is advantageous to eliminate the need for this adjustment such as by having this adjustment performed automatically by circuits within the receiver.

Automatic kinescope bias control systems are known. However, the known systems suffer from one or more disadvantages which are avoided by an arrangement according to the present invention.

Specifically, an automatic kinescope bias arrangement according to the present invention does not require a high voltage transistor for sensing kinescope cathode blanking current. Also, the disclosed system does not rely on the measurement of the absolute value of the very low cathode current in the vicinity of kinescope cut-off, and is substantially insensitive to cathode leakage currents which could otherwise lead to objectionable kinescope bias correction errors. With the disclosed system, a voltage instead of a very low current is sensed, and the absolute value of the sensed voltage need not be known.

Apparatus according to the present invention is included in a system for processing an image representative video signal with periodically recurring image and blanking intervals. The system includes an image reproducing kinescope having an electron gun with cathode and grid intensity control electrodes, a network for coupling video signals to the kinescope electron gun, and apparatus for automatically controlling the blanking level bias of the kinescope. The control apparatus includes a source of reference bias voltage, an auxiliary grid signal, and a voltage responsive sensing network. The reference bias voltage is provided to the cathode electrode via a cathode current conduction path during a measuring interval coincident with a portion of the blanking interval. The auxiliary signal is provided to the grid electrode during a portion of the measuring interval with a sense for forward biasing the grid electrode. The voltage responsive sensing network has an input coupled to the cathode current conduction path, and an output, for providing an output difference voltage proportional to the difference between current flowing in the cathode current path during the portion of the measuring interval in response to the auxiliary signal, and current flowing in the cathode current path at other times during the measuring interval. A network is also included for providing a control signal to the video signal coupling network in response to the voltage difference, for modifying the kinescope bias in a direction to reduce the voltage difference to a minimum level corresponding to a desired kinescope bias condition.

In accordance with a feature of the invention, the voltage sensing network comprises a voltage divider coupled between the kinescope cathode electrode and a point of operating potential.

In accordance with a further feature of the invention, the kinescope comprises plural cathode electrodes to which video signals are applied, and an associated grid electrode energized in common with respect to the plural cathode electrodes, and the auxiliary signal comprises a pulse applied to the common grid electrode.

In the drawing:

FIG. 1 illustrates a block diagram of a portion of a color television receiver including apparatus according to the present invention;

FIGS. 9 and 10 show circuit arrangements of other portions of the apparatus of FIG. 1;

FIGS. 11-16 depict signal waveforms useful in understanding the operation of the circuit shown in FIG. 10.

Figure 2:
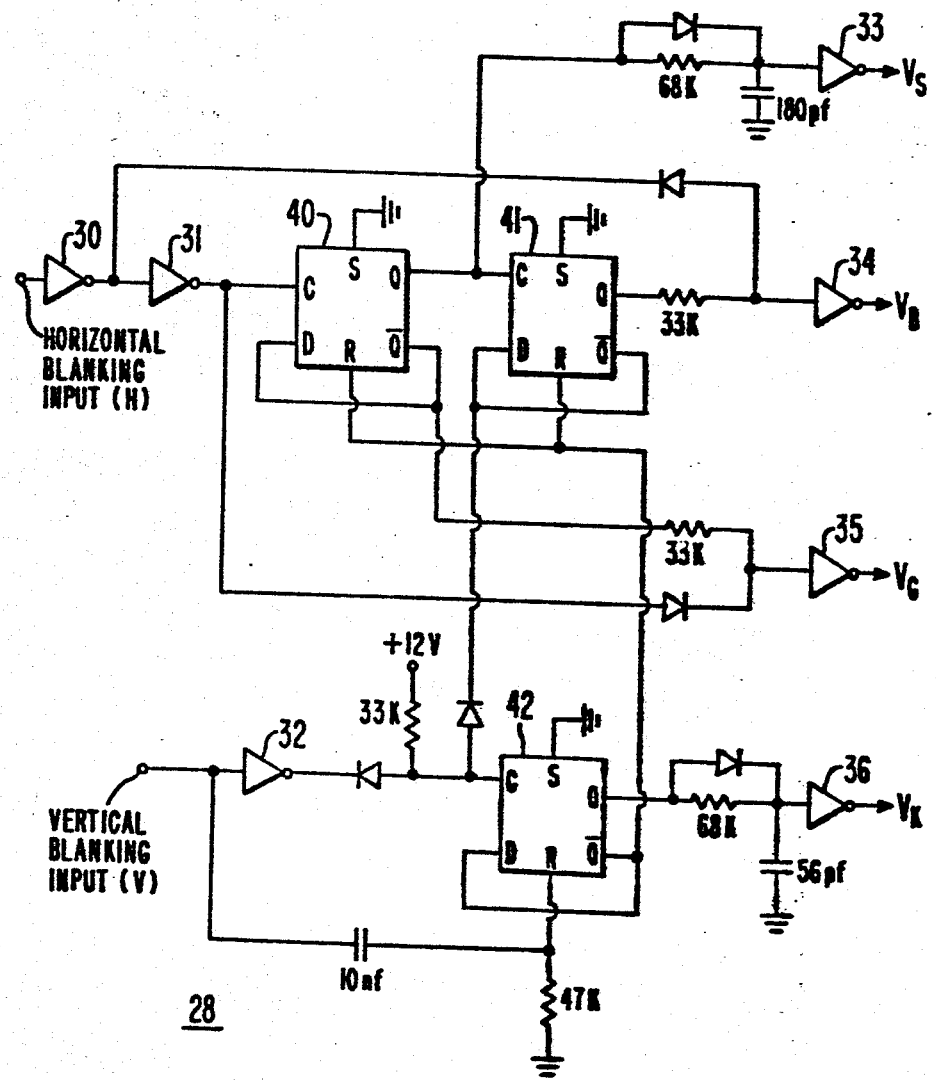
FIG. 2 shows a circuit arrangement of one portion of the apparatus shown in FIG. 1.
Figure 3:
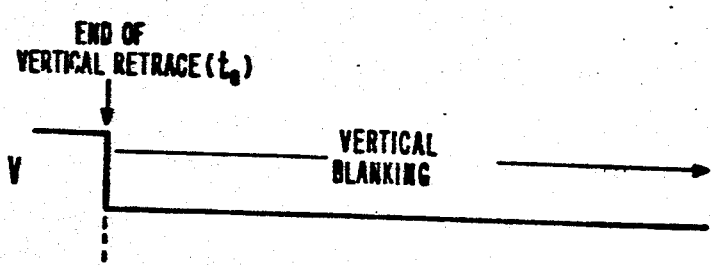
FIG. 3-8 depict signal waveforms useful in understanding the operation of the apparatus shown in FIG. 1.
Figure 4:
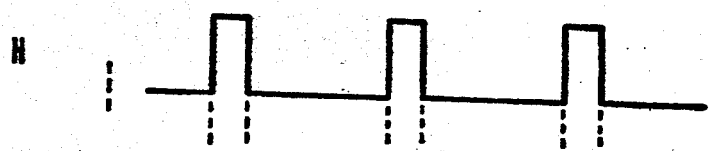
Figure 5:
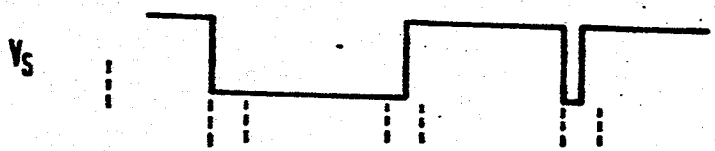
Figure 6:
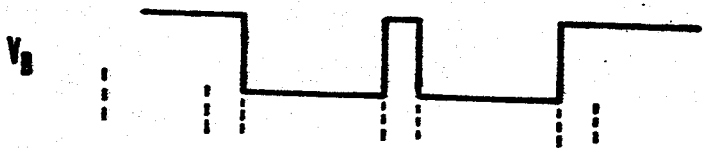
Figure 7:
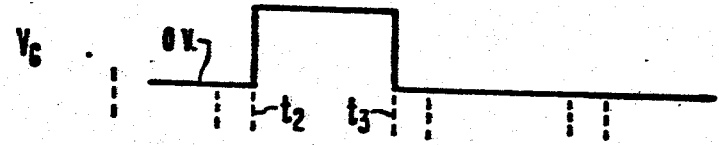
Figure 8:
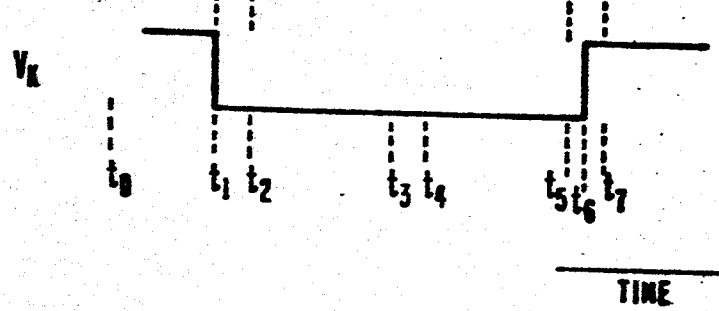

In FIG. 1, television signal processing circuits 10 (e.g., including video detector, amplifier and filter stages) provide separated luminance (Y) and chrominance (C) components of a composite color television signal to a demodulator-matrix 12. Matrix 12 provides output low level color image representative signals r, g and b. These signals are amplified and otherwise processed by circuits within cathode signal processing networks 14a, 14b and 14c, respectively, which supply high level amplified color image signals R, G and B to respective cathode intensity control electrodes 16a, 16b and 16c of a color kinescope 15. In this example, kinescope 15 is of the self-converging in-line gun type with a commonly energized grid 18 associated with each of the electron guns comprising cathode electrodes 16a, 16b and 16c.

Cathode signal processing networks 14a, 14b and 14c are similar in this embodiment. Therefore, the following discussion of the construction and operation of processing network 14a also applies to networks 14b and 14c.

In network 14a, a keyed gate 20 (e.g., an electronic switch) couples and decouples the r signal output from matrix 12 to a video signal input of a kinescope driver 21 in response to a keying signal $V_K$. Driver stage 21 includes a signal amplification network for developing high level output signal R which is applied to kinescope cathode 16a. An input of a voltage sensing network comprising a sensor 22 which is keyed by signals $V_B$ and $V_S$ is coupled to cathode 16a. Output signals from sensor 22 are supplied to a bias control stage 24, which produces an output control signal in response to input signals received from the sensing network. The control signal from stage 24 is supplied to another input of driver 21 for modifying the bias of the amplifier circuits within driver 21 to control the blanking or black level current conducted by cathode 16a, as will be discussed.

A control logic unit 28 is also included in the system of FIG. 1. Logic unit 28 responds to horizontal (H) and vertical (V) blanking signals derived elsewhere in the receiver for generating keying signal $V_K$ for gate 20 and keying signals $V_B$ and $V_S$ for sensor 22. Unit 28 also generates an output voltage pulse $V_G$ during intervals when the cathode blanking current of kinescope 15 is to be measured. The output of unit 28 from which signal $V_G$ is provided also provides an appropriate bias voltage for grid 18 (substantially zero volts in this example) at times other than the grid pulse interval.

A circuit arrangement of logic control unit 28 is shown in FIG. 2. The circuit includes a plurality of logic inverters 30–36 and flip-flop stages 40–42 arranged as shown. Flip-flops 40 and 41 are arranged as a counter circuit, and flip-flop 42 is arranged as a monostable ("one-shot") multivibrator. Each flip-flop stage includes inputs C and D, complementary outputs Q and $\bar{Q}$, and set (S) and reset (R) control inputs. Flip-flops 40–42 can be of the type included in integrated circuit type CD4013, and inverters 30–36 can be of the type included in integrated circuit type CD4049, both available from the Solid State Division of RCA Corporation, Somerville, New Jersey.

The horizontal blanking signals (H) are applied to inverter 30 and the vertical blanking signals (V) are applied to inverter 32. Output keying signals $V_S$, $V_B$, $V_G$ and $V_K$ appear at outputs of inverters 33, 34, 35 and 36, respectively. FIGS. 3–8 illustrate the waveforms for these keying signals together with horizontal and vertical blanking signals H and V, and the mutual timing relationship of these signals.

Considering FIG. 1 together with FIGS. 3–8, kinescope cathode blanking current monitoring is accomplished during each vertical blanking interval after the end of vertical retrace at a time $t_0$, but before the beginning of vertical field scanning (image trace). This time period encompasses several horizontal line intervals during which picture information is absent. Monitoring the cathode current at this time produces no visible effects on a displayed image, since the kinescope is overscanned at this time (i.e., the kinescope electron beam is deflected to strike the face of the kinescope above the image display area).

In accordance with the disclosed system, gate 20 is opened in response to keying signal $V_K$ to inhibit conduction of signal r from matrix 12 to driver 21. This occurs during a measuring interval between times $t_1$ and $t_4$ (see FIG. 8), during the first two horizontal lines after the end of vertical retrace. At this time, the quiescent output level of driver 21, and thereby cathode bias, is established at a fixed reference level determined by a biasing network within driver 21. Also at this time, a relatively low voltage positive pulse $V_G$ is supplied to kinescope control grid 18. As seen from FIG. 7, grid pulse $V_G$ occurs during time interval $t_2 - t_3$ within measuring interval $t_1 - t_4$. The positive grid pulse is disposed upon a lower pedestal level corresponding to the normal grid bias level of zero volts in this example.

A difference voltage proportional to the difference in cathode currents conducted over the measuring interval $t_1 - t_4$ is utilized to determine if the kinescope electron gun is properly blanked (i.e., conducting zero current or a predetermined very small blanking current), or conducting excessive blanking current. In the measuring mode, the kinescope functions as a cathode follower in response to grid pulse $V_G$, wherein a similarly phased version of grid pulse $V_G$ appears at the cathode electrode during time $t_2 - t_3$. The amplitude of the cathode pulse so developed is proportional to the level of cathode current conduction but is somewhat attenuated relative to grid pulse $V_G$ due to the relatively low forward transconductance of the kinescope gun grid drive characteristic. The amplitude of the cathode pulse is very small when the cathode blanking current is at the desired blanking level.

Under conditions of excessive cathode blanking current, the difference voltage is applied to bias control stage 24 after appropriate processing by sensor 22. An output control signal from bias control stage 24 is applied to a bias control input of driver 21 for modifying the D.C. (bias) operating point of driver 21 in a direction to develop a bias level at the output of driver 21 sufficient to produce the desired cathode blanking current level by closed loop action. Gate 20 returns to the closed position at the end of the measuring interval (after time $t_4$ in FIG. 8), thereby allowing color signals from the output of matrix 12 to be coupled to driver 21.

Figure 10:
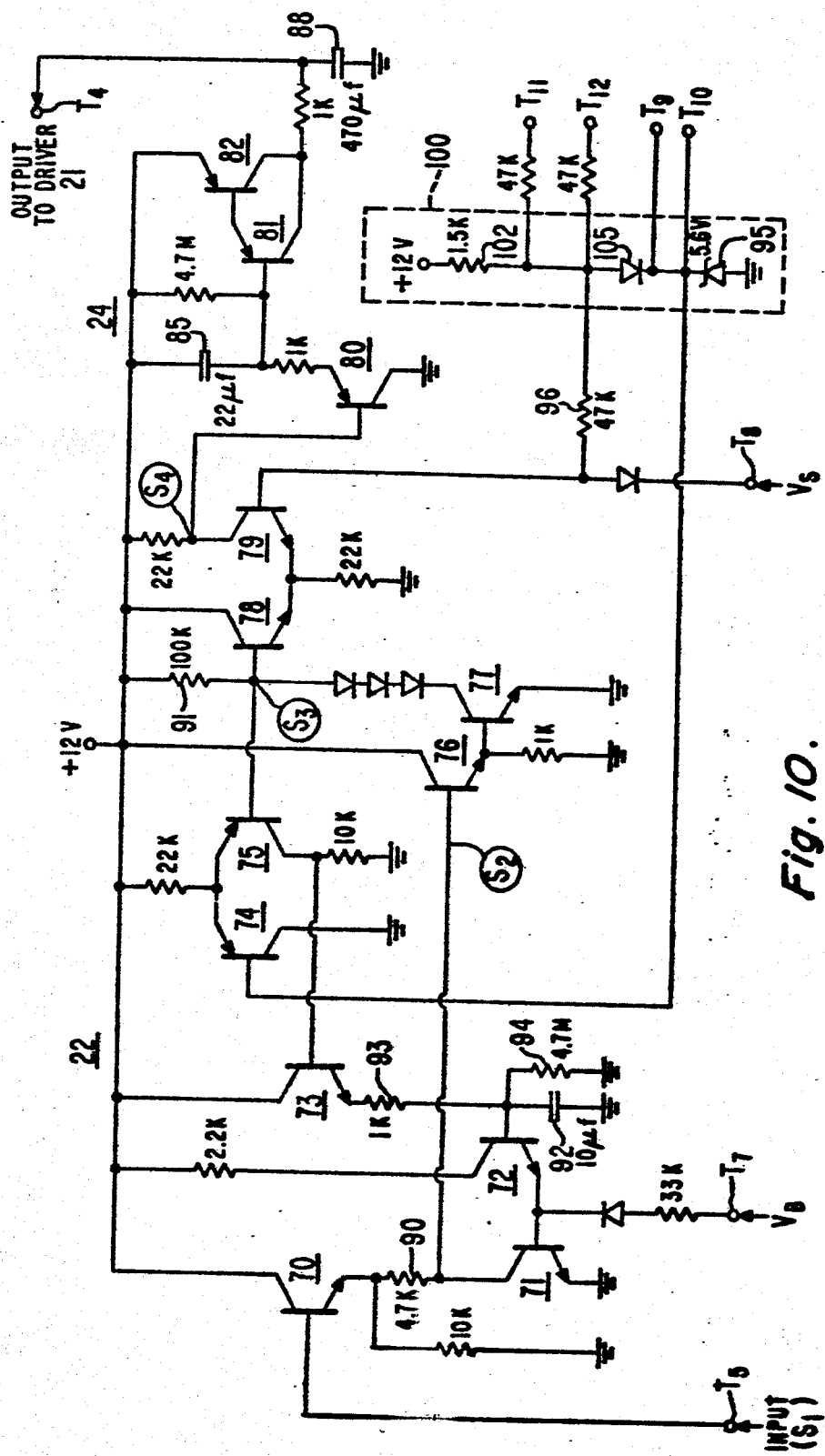

FIGS. 9 and 10 show circuit details of cathode signal processing network 14a (FIG. 1). Similar circuits are included in cathode signal processing networks 14b and 14c.

Considering FIG. 9, there is shown an arrangement of gate 20, which may comprise a transistor electronic switch, together with driver amplifier circuit 21. Signal r from matrix 12 is supplied to gate 20 via an input terminal $T_1$, and keying signals $V_K$ are supplied via a terminal $T_3$ to a control input of gate 20 (shown in the open position for the measuring condition).

Driver 21 includes an amplifier comprising an amplifier transistor 54 and an active load circuit including a transistor 55. An input circuit coupled to a base input of transistor 55 comprises a frequency compensation network 50 including a gain adjustment variable resistor 51. Output signals appear at an emitter of transistor 54 and are coupled to kinescope cathode 16a via an output circuit including an impedance network 60 and an output terminal $T_2$. A voltage sensing voltage divider comprising resistors 65 and 66 is coupled between kinescope cathode 16a and a point of reference potential (ground). A zener diode 58 coupled to an emitter of transistor 55 provides a reference bias voltage for transistors 54 and 55. In this example, the reference bias voltage provided by zener diode 58 is also applied via a terminal $T_6$ to corresponding amplifier circuits in cathode signal processing networks 14b and 14c.

With gate 20 open during the measuring interval as discussed, the quiescent output level of driver 21 and thereby the voltage appearing at output terminal $T_2$ are established at a fixed reference level determined by zener diode 58 together with a bias network including resistors 52, 53 and 57. An output voltage produced at the junction of voltage divider resistors 65 and 66 is coupled to the input sensor 22 via a terminal $T_5$. Attenuation of the voltage from voltage divider 65, 66 is compensated for by the gain of circuits within sensor 22. A bias control voltage developed at the output of bias control network 24 is coupled via a terminal 4 to resistor 57. This control voltage induces a correction current through resistor 57 to the base of transistor 55 such that the quiescent level appearing at the output of amplifier 21 and terminal $T_2$ is controlled in a direction to modify incorrect cathode blanking current levels toward the desired blanking level.

The cathode signal appearing at terminal $T_2$ is labeled $S_1$ and is shown in pertinent part in FIG. 13. In the waveform of FIG. 13, a positive cathode pulse induced by grid pulse $V_G$ during time $t_2 - t_3$ of the measuring interval in the presence of excessive cathode blanking current is designed as $\Delta V$ (e.g., of the order of 100 millivolts). FIGS. 11 and 12 are included to show the timing relationship between horizontal blanking signal H and keying pulse $V_K$, and cathode signal $S_1$ in FIG. 13.

In this system, cathode blanking current correction is not influenced by cathode leakage currents (e.g., cathode-heater leakage currents), since the disclosed system does not directly measure the value of very low level cathode currents in the vicinity of kinescope cutoff, which currents include a leakage component of unknown magnitude.

In this regard, it is noted that in the arrangement of FIG. 9 a current of approximately 1.7 milliamperes, including cathode blanking current, flows in voltage divider resistors 65, 66 during the entire measuring interval. This current is determined by the voltage then appearing across resistors 65, 66 at the kinescope cathode (approximately +180 volts), divided by the value of these resistors. Therefore, the cathode blanking current of a few microamperes represents an insignificant portion of the current flowing in voltage divider 65, 66. During time $t_2 - t_3$ of the measuring interval when grid pulse $V_G$ appears, a corresponding increase in cathode current is produced, together with an associated increase in the current flowing in voltage divider 65, 66.

Therefore, a voltage developed across resistor 66 is proportional to the difference in cathode current developed over the measuring interval. Instead of measuring the absolute value of the very small cathode blanking current at a given point in time, the disclosed arrangement responds to the voltage difference produced across resistor 66. The level of the voltage increment produced in response to the grid pulse, and the level of the difference voltage, are not influenced by cathode leakage currents, since signal transfer from the control grid to the cathode is accomplished by beam current conduction via kinescope cathode follower action, uninfluenced by cathode-heater leakage currents. A more specific example follows.

In the absence of grid pulse $V_G$ during the measuring interval, a very low cathode beam current ($i_{bL}$) is conducted by the kinescope. A higher cathode beam current ($i_{bH}$) is conducted in response to the grid pulse. The total current conducted by voltage divider 65, 66 in the absence and presence of the grid pulse consists of currents $i_{TL}$ and $i_{TH}$, respectively. These currents include a leakage component ($i_L$, approximately five microamperes), currents $i_{bL}$ and $i_{bH}$ noted above, and a quiescent current ($i_o$, approximately 1.6 milliamperes) supplied by the video driver amplifier, according to the following expressions:

$$i_{TL} = i_o + i_l + i_{bL}$$

$$i_{TH} = i_{bH} + i_l + i_o$$

The amplitude of the voltage appearing across voltage divider resistor 66 ($V_{66}$) over the measuring interval is proportional to the value of resistor 66 ($R_{66}$) and the currents noted above according to the expression:

$$V_{66} = R_{66}(i_{TH} - i_{TL}) = R_{66}(i_{bH} - i_{bL})$$

Therefore, the difference voltage developed across resistor 66 over the measuring interval and as coupled to sensor 22 is advantageously not influenced by current $i_o$ and leakage current $i_l$, and depends only on the cathode beam current difference ($i_{bH} - i_{bL}$). This current difference and therefore the level of the corresponding difference voltage ($V_{66}$) induced across resistor 66 become smaller as the cathode beam current approaches the desired blanking in the vicinity of kinescope cutoff.

In this example, a recommended range of amplitudes for grid pulse $V_G$ is from +5 to +15 volts, preferably with an amplitude tolerance of ±10%. Although signal $V_G$ is to be applied to the control grid such as the commonly energized single control grid found in self-converging "in-line" kinescopes, the video drive signal can be applied to the kinescope cathode as shown or to the control grid.

It is noted that the kinescope cathode can be A.C. coupled to sensor 22 rather than D.C. coupled as shown, by means of an additional capacitor (not shown) connected between resistor 65 and the circuit point at the interconnection of impedance network 60 and the kinescope cathode (FIG. 9). In this case, D.C. current $i_o$ (as previously defined) flowing in voltage divider 65, 66 is zero. The explanation and mathematical expressions mentioned previously remain valid in this case, but the current $i_{TL}$, $i_{TH}$, $i_{bL}$, $i_{bH}$ and $i_l$ as conducted by resistor 66 now represent A.C. values rather than D.C. values.

More specifically, in the case of A.C. coupling, the total current conducted by impedance 60 in the absence and presence of the grid pulse consists of currents $i_{TL}$ and $i_{TH}$ respectively. These currents include a leakage component $i_L$ and respective cathode beam currents $i_{bL}$ and $i_{bH}$ flowing from the kinescope cathode to the output of video amplifier 21, according to the expressions $$i_{TL} = i_{bL} + i_L$$

$$i_{TH} = i_{bH} + i_L$$

The magnitude of the voltage appearing across impedance 60 ($V_{60}$) over the measuring interval is proportional to the value of impedance 60 ($Z_{60}$) and the currents given above, according to the expression:

$$V_{60} = Z_{60}(i_{bH} - i_{bL})$$

This voltage is not influenced by leakage current $i_L$. Voltage $V_{60}$ is referenced to ground due to the low A.C. signal output impedance of video amplifier 21, and is derived from the cathode side of impedance 60 via the additional capacitor. Voltage $V_{60}$ is coupled to sensor 22 via voltage divider 65, 66.

FIG. 10 shows circuit details of sensor 22 and bias control 24. Sensor 22 includes a circuit comprising low voltage transistors 70–79, and bias control 24 includes a circuit comprising low voltage transistors 80–82.

Cathode signal $S_1$ as developed across resistor 66 in FIG. 9 is coupled via terminal $T_5$ to a base input of transistor 70 in circuit 22. A current source transistor 71 in the emitter circuit of transistor 70 is included in a feedback clamping circuit as will be described, for shifting the D.C. level across an emitter resistor 90. Keying signal $V_B$ (FIG. 6) is applied to a base electrode of transistor 71 via a terminal $T_7$, and serves to control the conductive state of transistor 71.

A version of input signal $S_1$ as appearing in the emitter circuit of transistor 70 is blanked or inhibited at all times except during times $t_2 - t_3$ and $t_4 - t_5$. A resulting signal, $S_2$ in FIG. 14, is applied to an amplifier comprising transistors 76 and 77. An amplified and inverted version of this signal is developed across a resistor 91. This amplified and inverted signal is designated as $S_3$ and is shown in FIG. 15.

Signal $S_3$ includes a first pulse component $P_1$ between times $t_2$ and $t_3$, and a second pulse component $P_2$ between times $t_4$ and $t_5$. The difference in amplitude $\Delta V'$ between pulse $P_1$ and $P_2$ is attributable to cathode pulse $\Delta V$ (FIG. 13) as developed in response to grid pulse $V_G$. In this case, the presence of pulse $\Delta V$ and amplitude difference $\Delta V'$ corresponds to a condition of excessive cathode blanking current. The amplitude $\Delta V$ of the cathode pulse (FIG. 13) and thereby the amplitude difference between pulses $P_1$ and $P_2$ (FIG. 15) become smaller as the cathode blanking current approaches the correct blanking level.

The negative-going peak amplitude excursions of signal $S_3$ are further processed by a feedback clamping circuit comprising comparator transistors 74, 75 and a peak detection and holding circuit comprising transistors 72 and 73, a capacitor 92, resistors 93, 94 and resistor 78. This circuit serves to clamp the negative-going amplitude excursion of pulse $P_1$ in signal $S_3$ to a level corresponding to a +5.6 volt reference voltage level developed at a base input of comparator transistor 74 by means of a zener reference diode 95. A resulting signal from the collector output of transistor 75 is applied to a base input of controlled current source transistor 71 for shifting the D.C. level of the input signal developed across resistor 90. The magnitude of the level shift is proportional to the charge on capacitor 92, and serves to stabilize the level of signal $S_3$. Specifically, the feedback clamp network by level shifting action keeps signal $S_3$ at the correct operating level within sensor 22, in the presence of conditions which would otherwise alter the D.C. level of signal $S_3$ (e.g., due to fluctuations in operating supply voltages or kinescope electrode voltages).

Signal $S_3$ is applied to a comparator comprising transistors 78 and 79, which develops a signal $S_4$ (FIG. 16) at a collector output of transistor 79. The threshold switching level of comparator 78, 79 is +6.2 volts in this example, as determined by a bias voltage applied to the base electrode of comparator transistor 79 via a resistor 96 from a bias network 100. The +6.2 volt threshold switching level of comparator 78, 79 is slightly above the +5.6 volt clamping level of applied signal $S_3$.

Bias network 100 is common to each cathode signal processing network (i.e., networks 14a, 14b and 14c) in this instance. Network 100 includes a resistor 102, a diode 105 and zener diode 95 all arranged in series between a source of positive D.C. potential (+12 volts) and a point of reference potential (ground). The +6.2 volt threshold switching level for comparator 78, 79 equals the sum of the voltage drops across diode 105 (+0.6 volts) and diode 95 (+5.6 volts). A +5.6 volt reference voltage for use by corresponding circuits in cathode signal processing networks 14b and 14c (FIG. 1) is supplied via terminals $T_9$ and $T_{10}$. Threshold switching voltages (+6.2 volts) for use by corresponding circuits in networks 14b and 14c are available from bias network 100 via terminals $T_{11}$ and $T_{12}$, respectively.

Comparator 78, 79 is disabled in response to signal $V_S$ during time $t_2 - t_3$ when pulse $P_1$ appears (FIG. 15). At this time the comparator produces a continuous positive D.C. output level corresponding to signal $S_4$ in FIG. 16. This output level is also produced during time $t_4 - t_5$ when pulse $P_2$ appears, for conditions of excessive blanking current.

Under conditions of excessive cathode blanking current, the continuous positive output level from comparator 78, 79 (signal $S_{4a}$) is applied to an inverting peak detector circuit including transistors 80, 81, 82 and a charge storage capacitor 88, whereby a bias correction voltage appears at terminal $T_4$ after filtering by capacitor 88. This correction voltage is applied to driver amplifier 21 via terminal $T_4$ with a sense to increase the quiescent output level of amplifier 21 and thereby increase cathode bias in a positive direction to reduce the cathode blanking level toward the desired level.

The quiescent output level of amplifier 21 continues to rise, and the cathode blanking current level continues to decrease, until the amplitude of pulse $P_2$ of signal $S_3$ (FIG. 15) reaches the threshold switching level of comparator 78, 79. At this time the comparator operates to produce a negative-going output pulse corresponding to signal $S_{4b}$ in FIG. 16. The inverting peak detector circuit detects and stores a voltage representative of the peak level of signal $S_{4b}$ on capacitor 88. Due to the inverting action of peak detector transistors 81 and 82, this voltage is positive relative to the signal from comparator 78, 79 and serves to increase the charge on capacitor 88. Accordingly, the bias correction voltage derived from signal S46 and supplied to amplifier 21 via terminal T4 is in a direction to prevent further increases in the quiescent output level of driver amplifier 21 when the desired cathode blanking current level is reached.

In this embodiment, it is assumed that the correct blanking current level corresponds to a very small, non-zero level. Therefore, incorrect cathode blanking current corresponds to a condition of excessive current conduction above the very small desired level, or to a condition of zero cathode blanking current. The former incorrect condition has already been discussed. In the case of the latter incorrect condition of zero blanking current, the bias control signal is supplied from circuit 24 to amplifier 21 with a sense for modifying the quiescent output level of amplifier 21, and therefore cathode bias, in a direction to increase cathode blanking current toward the correct, very small level. In this case, the negative pulse of signal S46 exhibits a less positive level. With reference to signal S3 (FIG. 15), the amplitude of pulse P2 approaches that of pulse P1 and amplitude difference ΔV' becomes smaller. As a practical matter, the amplitude of pulse P2 will be between the +6.2 volt switching level and the +5.6 volt clamping level of signal S2, thereby causing comparator transistor 79 to conduct more heavily with a corresponding reduction in the collector output voltage of transistor 79. Accordingly, the level of pulse S46 developed at the collector of transistor 79 becomes less positive.

In this example, kinescope bias correction is accomplished over several scanning fields, since several pulses (signal S46) are required to charge capacitor 85 to the peak level of signal S46. Also, several fields are required to correspondingly discharge capacitor 85. The charging and discharging time constants for capacitor 85 are chosen to provide a bias correction voltage on filter capacitor 88 without field-rate ripple which would otherwise cause brightness modulation from the top to bottom of a displayed picture.

Figure 17:
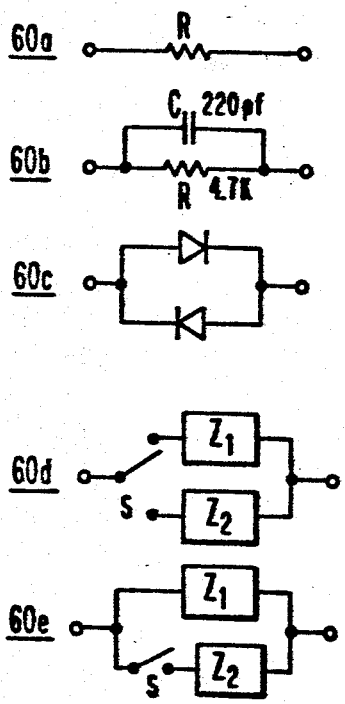
FIGS. 17 and 18 illustrate alternative embodiments of portions of the circuit shown in FIG. 9.

Impedance network 60 shown in FIG. 9 serves to avoid excessive attenuation of the induced cathode output signal (e.g., pulse ΔV in FIG. 13) by increasing the external cathode impedance. Such attenuation could otherwise occur since the internal kinescope cathode impedance is relatively high, particularly at low cathode currents, while the output impedance of driver amplifier 21 is very low. FIG. 17 shows alternative circuit embodiments of impedance 60.

Impedance 60 may comprise a single resistor (R), as shown by circuit 60a, or a parallel resistance (R) and capacitance (C) combination as indicated by circuit 60b. The latter circuit permits an increased value of resistance R without an accompanying loss of video signal bandwidth. For this purpose, the value of capacitance C should be low enough to exhibit a high impedance at frequencies associated with the cathode drive signal. Suitable values of resistor R and capacitor C are shown in the drawing.

Network 60 may also comprise a pair of diodes connected in inverse parallel relationship, as seen from circuit 60c. This diode circuit exhibits a low impedance for large cathode signals, and a large impedance for small cathode output signals such as occur during the described measuring interval. High diode impedance results when very little or no diode D.C. current flows when the diodes are biased in the vicinity of diode cut-off. This condition results with A.C. coupling between the cathode electrode and sensor 22 when substantially equal voltages appear at the input and output terminals of the diode circuit, such as during the measuring interval as the cathode blanking current level approaches the desired blanking level. With D.C. coupling between the kinescope cathode and sensor 22 via resistors 65, 66 as shown in FIGS. 9 and 10, a current $i_o$ (as previously defined) will flow through one of the diodes in circuit 60c, thereby continuously maintaining a low diode impedance.

Further alternatives are indicated by the switched impedance circuits 60d and 60e. Each of these circuits includes an electronically activated switch $S_1$ and a pair of impedance paths $Z_1$ and $Z_2$. In each case, switch S is activated during the picture scanning time such that the circuits exhibit a low impedance from input to output, and switch S is activated during the cathode current measuring interval such that the circuits exhibit a high impedance from input to output.

Figure 18:
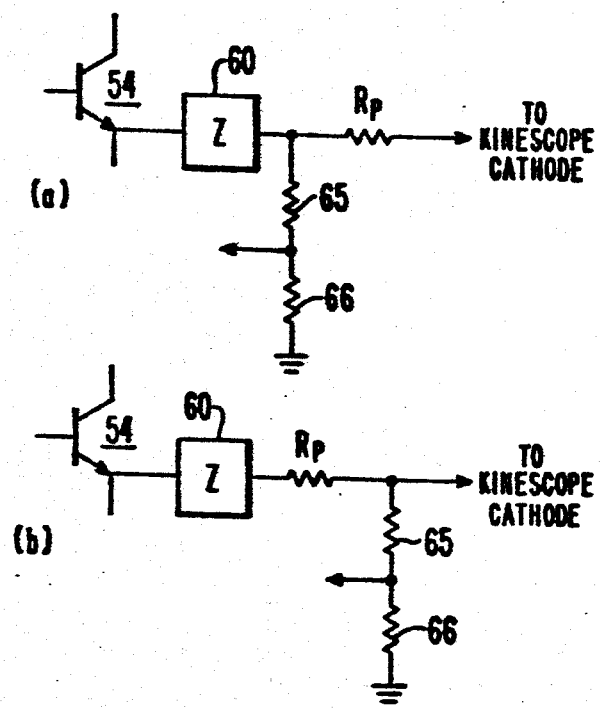

FIG. 18 shows modifications of the cathode circuit coupled between the output of driver amplifier transistor 54 (FIG. 9) and the kinescope cathode electrode. Circuits (a) and (b) of FIG. 18 show alternative couplings of an arc suppression (current limiting) protection resistor $R_p$ between amplifier transistor 54 and the kinescope cathode.

Although the invention has been described in terms of a preferred embodiment, it should be recognized that various modifications can be made without departing from the scope of the invention.

Illustratively, in connection with FIG. 9, it was mentioned that, during the measuring interval, a quiescent reference level is established by the coaction of resistors 52, 53, 57 and diode 58. However, this reference level could be established by other means, such as in response to a suitable reference level available from the video signals which would then be supplied to the kinescope drivers during the measuring interval.

In addition, other versions of grid signal $V_G$ could be employed.

What is claimed is:

1. In a system for processing an image representative video signal having periodically recurring image intervals and blanking intervals, said system including an image reproducing kinescope having an electron gun with cathode and grid intensity control electrodes, and means for coupling video signals to said kinescope electron gun; apparatus for automatically controlling the blanking level bias of said kinescope, comprising:

means for providing a reference bias voltage to said cathode electrode via a cathode current conduction path during a measuring interval coincident with a portion of said blanking interval;

means for providing an auxiliary signal to said grid electrode during a portion of said measuring interval with a sense for forward biasing said grid electrode;

voltage responsive sensing means with an input coupled to said cathode current conduction path and an output, for providing an output difference voltage proportional to the difference between current flowing in said cathode current path during said portion of said measuring interval in response to said auxiliary signal, and current flowing in said cathode current path at other times during said measuring interval; and means responsive to said difference voltage for providing a control signal to said video signal coupling means, for modifying the bias of said kinescope in a direction to reduce said voltage difference to a minimum level corresponding to a desired kinescope bias condition.

2. Apparatus according to claim 1, wherein:
said voltage sensing means comprises a voltage divider network coupled between said cathode electrode and a point of operating potential; and
said auxiliary signal comprises a voltage pulse.

3. Apparatus according to claim 2, wherein:
said voltage divider means comprises a resistive network.

4. Apparatus according to claims 1 or 2, wherein:
said amplified video signal is supplied to said cathode electrode; and
said auxiliary signal is provided independent of said video signal.

5. Apparatus according to claim 4, wherein:
said measuring interval occurs during a vertical image blanking interval of said video signal.

6. In a television receiver for processing an image representative video signal having periodically recurring image intervals and vertical and horizontal blanking intervals, said system including an image reproducing kinescope with an intensity control electron gun having cathode and grid electrodes, and a video signal coupling path including a video amplifier for supplying an amplified video signal to said cathode electrode; apparatus for automatically controlling the blanking level bias of said kinescope, comprising:
means for providing a reference bias voltage to said cathode electrode via said video signal coupling path during a measuring interval coincident with a portion of said vertical blanking interval;
means for providing an auxiliary signal to said grid electrode during a portion of said measuring interval with a sense for forward biasing said grid electrode;
voltage responsive sensing means with an input coupled to said cathode electrode and an output, for providing an output difference voltage proportional to the difference between current flowing in said video signal coupling path during said portion of said measuring interval in response to said auxiliary signal, and current flowing in said video signal coupling path at other times during said measuring interval; and
means responsive to said difference voltage for providing a control signal to said video signal coupling path, for modifying the bias at said cathode electrode in a direction to reduce said voltage difference to a minimum level corresponding to a desired kinescope bias condition.

7. Apparatus according to claim 6, wherein:
said control signal is applied to said amplifier for modifying the quiescent output level of said amplifier and thereby cathode electrode bias in a direction to reduce said voltage difference to a minimum.

8. Apparatus according to claim 6, wherein:
said kinescope comprises plural cathode electrodes and an associated grid electrode energized in common with respect to said plural cathode electrodes.

9. Apparatus according to claims 6, 7 or 8, wherein said apparatus further comprises:
impedance means coupled between said amplifier and said cathode electrode, said impedance means exhibiting one value of impedance with respect to cathode signals during said measuring interval and a relatively lower value of impedance with respect to cathode signals at other times.

* * * * *